United States Patent
Siuchta et al.

(10) Patent No.: US 10,060,427 B2
(45) Date of Patent: Aug. 28, 2018

(54) CONTROL FOR ENGINE DRIVEN COMPRESSOR

(75) Inventors: Grzegorz Siuchta, Des Plaines, IL (US); Dean Alan Oppermann, Plainfield, IL (US); Raul Espinosa, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 830 days.

(21) Appl. No.: 14/372,473

(22) PCT Filed: Jan. 18, 2012

(86) PCT No.: PCT/US2012/021651
§ 371 (c)(1),
(2), (4) Date: Jul. 16, 2014

(87) PCT Pub. No.: WO2013/109259
PCT Pub. Date: Jul. 25, 2013

(65) Prior Publication Data
US 2014/0369853 A1    Dec. 18, 2014

(51) Int. Cl.
*F04B 49/03* (2006.01)
*B60T 17/02* (2006.01)
(Continued)

(52) U.S. Cl.
CPC .............. *F04B 49/03* (2013.01); *B60T 17/02* (2013.01); *F04B 35/002* (2013.01); *F04B 41/02* (2013.01)

(58) Field of Classification Search
CPC .......... F04B 17/05; F04B 49/02; F04B 49/03; F04B 2203/06; F04B 2203/0604; F04B 2203/0605; F04B 2207/042; F04B 2207/0421; F04B 2207/0422; F02B 67/00; F02B 67/04; F02B 67/06; B60T 17/02; F04D 2200/06; F04D 2200/0614;
(Continued)

(56) References Cited

U.S. PATENT DOCUMENTS 2,649,241 A * 8/1953 Cady ..................... F04B 49/022
                                                        417/279
6,036,449 A * 3/2000 Nishar ................... B60K 25/00
                                                        417/292
(Continued)

*Primary Examiner* — Dominick L Plakkoottam
*Assistant Examiner* — Philip Stimpert
(74) *Attorney, Agent, or Firm* — Jeffrey P. Calfa; Jack D. Nimz

(57) ABSTRACT

A controller for a vehicle pneumatic system loads a compressor responsive to engine power absorption by the engine and air storage facility air pressure readings up to a pressure limit. The controller is responds to power demand on the engine in excess of an engine speed related global maximum and air pressure readings down to a global minimum for unloading the compressor. The controller provides for loading and unloading the compressor to maintain storage facility pressure within an operating maximum and an operating minimum which lie between the global maximum and global minimum pressures. The controller responds to air pressure readings reaching or falling below the global minimum for loading the compressor and to air pressure readings reaching or exceeding the global maximum for unloading the compressor.

2 Claims, 4 Drawing Sheets

(51) Int. Cl.
*F04B 35/00* (2006.01)
*F04B 41/02* (2006.01)

(58) Field of Classification Search
CPC ......... F04D 2200/0616; F04D 2200/60; F04D 2200/602
USPC .............. 417/34, 36, 364, 440; 60/626–629; 123/2, 198 C, 339.16, 339.18, 492; 701/104
See application file for complete search history.

(56) References Cited

U.S. PATENT DOCUMENTS

| | | | | |
|---|---|---|---|---|
| 6,922,997 B1 * | 8/2005 | Larson | ..................... | B60K 6/12 60/597 |
| 6,959,545 B2 * | 11/2005 | Lippert | ..................... | B60K 6/12 417/34 |
| 2005/0109028 A1 * | 5/2005 | Shirakawa | ............ | F01N 3/0814 60/602 |
| 2008/0264922 A1 * | 10/2008 | Fosbinder | ............ | B23K 9/1006 219/133 |

\* cited by examiner

CONTROL FOR ENGINE DRIVEN COMPRESSOR

BACKGROUND

Technical Field

The technical field relates generally to motor vehicle compressed air systems and more particularly to control over an internal combustion engine driven compressor in a compressed air system.

Description of the Technical Field

In order to meet demands for improved motor vehicle fuel economy engineers have taken steps to reduce energy consumption attributable to parasitic motor vehicle systems such as power steering systems, air conditioning systems and pneumatic systems. Pneumatic systems have long been used with motor vehicle air brake systems and recent developments have expanded the scope of their application on vehicles. A pneumatic system architecture utilizes a piston in cylinder type compressor pump which is mechanically engaged to the thermal/internal combustion engine. The compressor pump feeds a compressed air storage system (represented here as a simple tank) through a check valve. The compressor draws air through an intake valve which may be closed to allow compression of air during a piston compression stroke and opened to allow air to be drawn into the compressor during a piston down stroke.

Air pressure in the storage system is kept within minimum and maximum bounds by discontinuing delivery of air to the storage system when pressure in the storage system reaches a maximum allowed level and resuming air delivery when pressure falls to a minimum allowed value or is below the minimum allowed value, as may occur on engine start where the vehicle has sat for some time. In simple systems, when fully pressurized, the compressor pump may continue to operate and compressed air discharged to the environment. In such an arrangement the compressor pump absorbs up to two or more horsepower from the engine.

In order to avoid the waste of driving a compressor pump when pressure in the storage system is at its maximum allowed value, some systems provide for the compressor to be mechanically disengaged or unloaded. Mechanical disengagement can involve use of a clutch and can impose a penalty in terms of added weight and relative complexity compared with systems for unloading the compressor. Unloading a compressor interrupts the compression cycle. To do this a compressor unloader holds the compressor's intake valve open when compressed air storage facilities are fully pressurized. The air compressor piston continues to cycle, but simply draws and pushes air in and out through the intake valve. Little or no compression of air occurs and the load imposed by the air compressor on the engine is reduced to relatively minor frictional losses.

The compressor unloader itself is a piston which is displaced to hold open the compressor intake valve. Pneumatic compressor unloaders utilize compressed air from system storage the flow of which is triggered when air pressure in storage reaches its maximum allowed value. When air pressure in the storage system falls to or is below the minimum allowed value the compressor unloader is discharged and the air compressor intake valve operates to allow the air compressor to compress air.

SUMMARY

A vehicle pneumatic system includes an engine, an air compressor coupled to the engine to be driven by the engine, an air storage facility connected to receive air pumped by the air compressor, an air compressor unloader, an air pressure sensor for generating pressure readings from the air storage facility, sensors for indicating power output from or absorption by the engine, a sensor for indicating power requested from the engine and a tachometer for measuring engine speed. A controller is provided responsive to indication of power absorption by the engine and air pressure readings from the air storage facility for turning the air compressor unloader off. The unloader remains off up to a global pressure limit. The controller is further responsive to indication of power demand in excess of a engine speed related maximum limit for turning the air compressor unloader on. It can remain on down to a global pressure minimum. The controller is responsive to air pressure readings reaching or falling below the global minimum for turning the air compressor unloader off and to air pressure readings reaching or exceeding the global maximum for turning the air compressor unloader on notwithstanding the engine state as long as it is turning and generating or absorbing power. The controller is otherwise responsive to pressure air pressure readings and indication of engine operation for turning the air compressor unloader on and off to maintain air pressure in the air storage facility within a normal operating maximum and a normal operating minimum.

DETAILED DESCRIPTION

Figure 1:
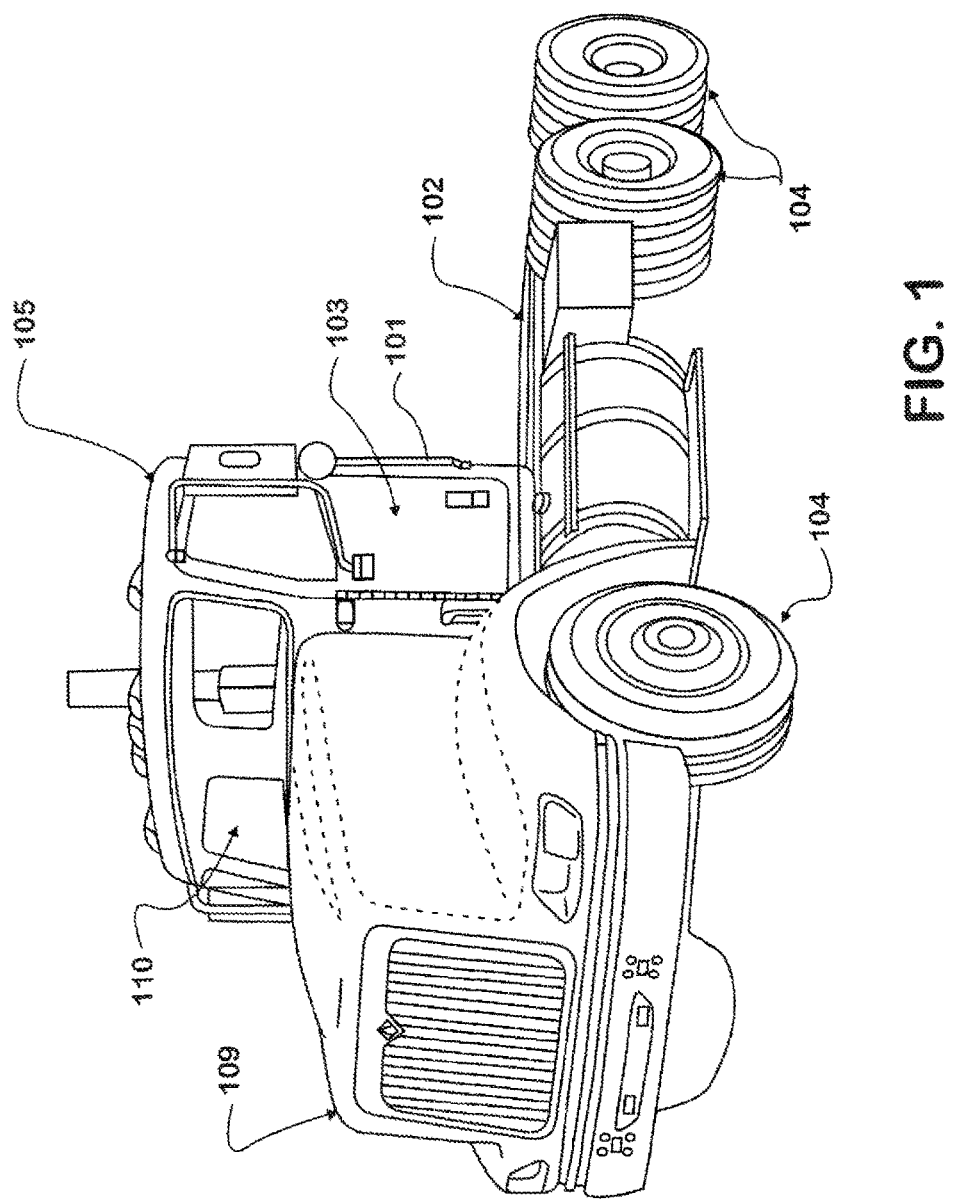
FIG. 1 is a perspective view of a truck which is equipped with an engine driven pneumatic system.

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Referring now to the figures and in particular to FIG. 1, a truck 101 supporting a pneumatic system 51 (see FIG. 2) is shown. Truck 101 is typically a diesel engine equipped vehicle having a pneumatic brake system. Truck 101 is supported by wheels 104 which support a chassis 102 which in turn carries a cab 105. Cab 105 is provided with an engine compartment 109, a greenhouse 110 and a door 103.

Figure 2:
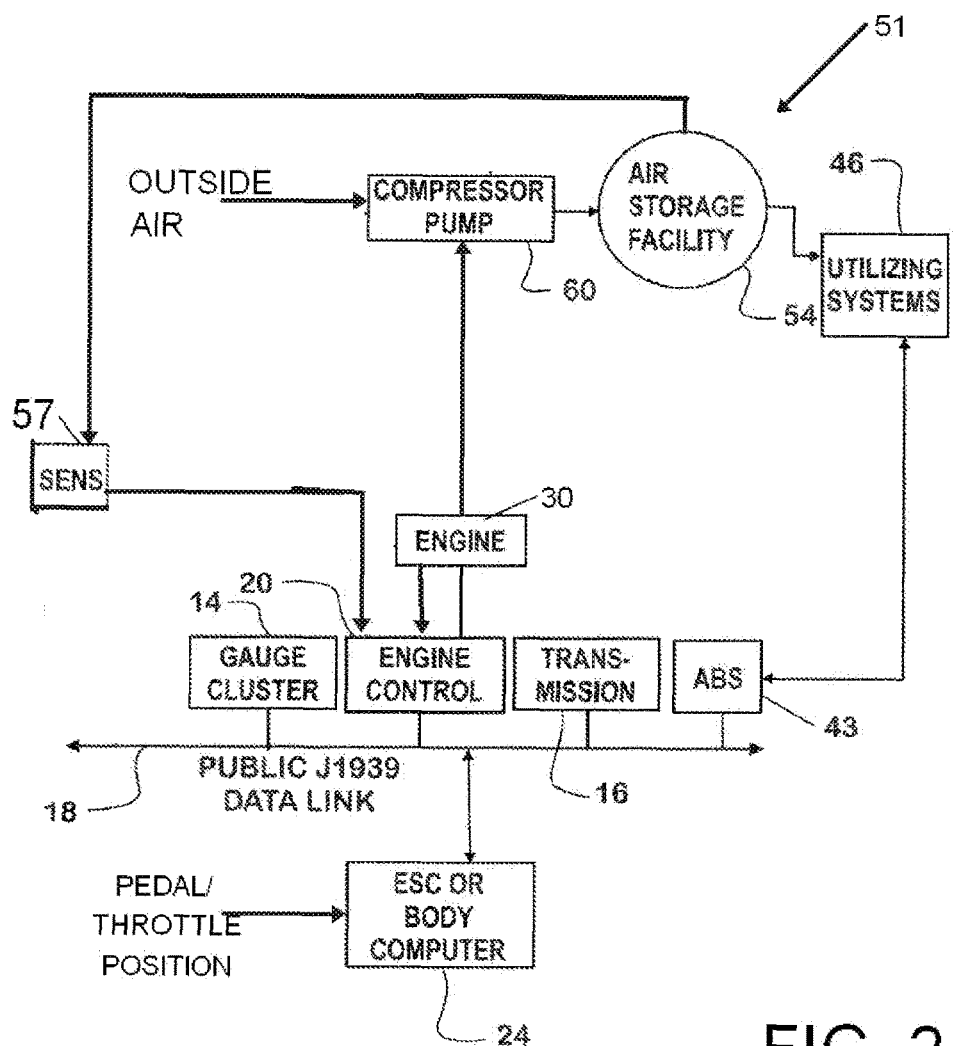
FIG. 2 is a high level block diagram of major vehicle systems for the truck of FIG. 1.

FIG. 2 is a high level schematic of major vehicle systems installed on truck 101. A pneumatic system 51 includes an air compressor 60, a compressed air storage facility 54 and one or more compressed air utilizing systems/loads 46 such as a pneumatic brake system. Control over the pneumatic system 51 may be integrated with other vehicle systems using network technology such as a controller area network (CAN). A CAN may be implemented using an SAE (Society of Automotive Engineers) J1939 compliant public data link 18. Several controllers are coupled to data link 18 for the exchange of data and commands.

Among the controllers coupled to the public data link 18 are an electronic system controller (ESC) 24, a type of body computer, a gauge cluster controller 14, an engine control module (ECM) 20, a transmission controller 16 and an anti-lock brake system (ABS) controller 43. ECM 20 supplies control signals relating engine 30 control such as signals controlling operation of fuel injectors (not shown) and receives signals from engine 30 mounted sensors such as engine speed (RPM) from a tachometer (not shown). An engine 30 speed measurement may be made by the transmission controller 16 based on signals from a transmission mounted tachometer (not shown). In this case the engine speed signal is transmitted over data link 18 and may be received by ECM 20 and ESC 24. Fuel flow and engine speed relate to the load being placed on the engine 30 and may be used by the ECM 20 to generate signals named "MF_TOT", relating to maximum allowed fuel flow and "MF_SLM", relating to maximum fuel allowed for smoke limiting. ESC 24 usually provides a connection to an accelerator or throttle position sensor and generates a "throttle position (TP)" signal relating thereto. This signal may be generated autonomously by ESC 24 in response to a speed control setting. In addition, ECM 20 is connected to receive a signal from an air pressure sensor 57 which relates to the pressure of gas/air stored in the air storage facility 54.

Figure 3:
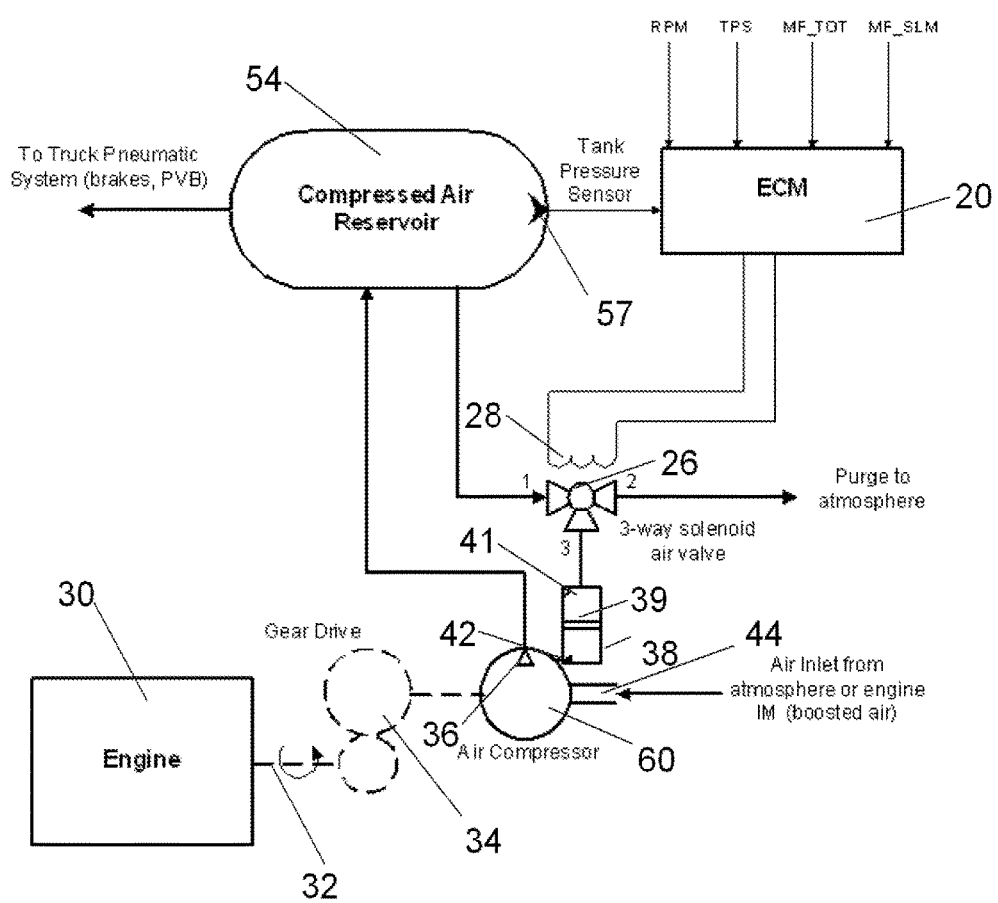
FIG. 3 is a block diagram of a pneumatic system compressor control system.

Referring to FIG. 3, control elements for an engine 30 driven air compressor 60 are illustrated in greater detail. Air compressor 60 may be any type of positive displacement compressor with a pneumatically controlled ON/OFF (LOAD/UNLOAD) feature such as a compressor or "intake valve" unloader 38. A compressor unloader 38 includes an unloader piston 39. When compressed air is fed into the cavity 41 above the unloader piston 39 the unloader piston moves down and holds an air compressor 60 intake valve 42 open. This stops compression in and discharge of air from the air compressor 60.

Air compressor 60 is driven by a gear drive 34 connected between the crankshaft 32 of engine 30 and the air compressor 60. In the present embodiment air compressor 60 is based on a piston (not shown) which reciprocates in a cylinder. During down strokes of the piston an intake valve 42 in an air intake inlet 44 opens allowing air to be drawn in the air compressor 60. During compression strokes the intake valve 42 is usually closed resulting in air being compressed until pressure reaches a level allowing air to be discharged through a check valve 36 to the compressed air storage facility 54. In some applications air intake inlet 44 may receive air from an engine intake air boost system 48 such as a turbocharger or a supercharger.

In order to reduce the load imposed on engine 30 by air compressor 60 when air pressure in the compressed air storage facility 54 reaches a maximum allowed value, air compressor 60 can be "unloaded" by compressor unloader 38 which operates to hold the intake valve 42 open until pressure declines to a minimum allowed value, unless engine 30 begins to absorb power. With the intake valve 42 held open air simply cycles in and out of the air intake inlet 44.

Compressor unloader 38 is itself a pneumatic device which operates using compressed air from the compressed air storage facility 54. Compressed air is delivered to compressor unloader 38 by a three way valve 26 from the compressed air storage facility 54. Three way valve 26 may also be operated to discharge compressed air from compressor unloader 38 to the environment/atmosphere. Three way valve 26 is mechanically actuated cycled by control signals applied to a solenoid 28.

Air compressor 60 is loaded or "turned on" by connecting cavity 41 to the ambient environment (that is, applying zero gauge pressure). To unload or "turn-off" air compressor 60 cavity 41 is opened to the compressed air storage facility 54 through three way valve 26. Provided that compressed air at sufficient pressure is in the compressed air storage facility/ tank 54, unloader piston 39 moves down under pressure which allows the intake valve 42 to operate. If for some reason three way valve 26 fails with the cavity 41 open to the compressed air storage facility 54 and air pressure is below minimum levels to operate the compressor unloader 38 the compressor unloader 38 will no longer hold the intake valve 42 open.

The broad pressure range maintained in the compressed air storage facility 54 range from about 90 PSI (P_Min_Global) to about 150 PSI (P_Max_Global). P_Max_Global is a maximum limit on pressurization for the compressed air storage facility 54. P_Min_Global is a minimum pressure selected to provide for meeting demands from vehicle pneumatic systems 46. P_Max and P_Min for the compressed air storage facility 54 are, respectively, lower and higher than the global values and are termed here the normal operating maximum and operating minimum pressure limits. These values avoid excessive ON/OFF cycling of the air compressor 60 while recognizing that increasing air pressure in the air storage facility 54 results in increasing loading on the engine 30 as long as the compressor remains loaded. In broad terms, air pressure in the compressed air storage facility 54 is allowed to exceed P_Max only in response to opportunities to exploit engine 30 absorption of vehicle kinetic energy (engine braking). Slowing the vehicle is then used as a source of power to drive air compressor 60. Air pressure is allowed to fall below P_Min under circumstances where engine operating variables indicate the engine 30 is operating under a particularly heavy load and is done to avoid diversion of power from the engine to drive the air compressor 60 under those circumstances until air pressure reaches the global minimum. This usually occurs when a vehicle is moving slowly and any braking demand is likely to impose a minimal drain on compressed air resources.

The pressure signal from pressure sensor 57 is used as a basic feed-back signal by ECM 20 to maintain system pressure. ECM 20 utilizes additional engine related operating variables (engine speed (RPM), Throttle Position (TPS), Total Fuel (MF_TOT), Maximal Fuel Allowed for smoke limiting (MF_SLM)) to determine air compressor 60 ON/OFF state to implement finer control over pressure and to allow capture of energy otherwise lose during vehicle braking. In effect MF_TOT and MF_SLM function as the present or immediate power limits on engine 30 output at given engine speeds (RPM). Control of the compressor unloader 38 is implemented by application of an ON/OFF signal to solenoid 28 to position the three way valve 26 which in turn controls loading and unloading of air compressor 60.

Figure 4:
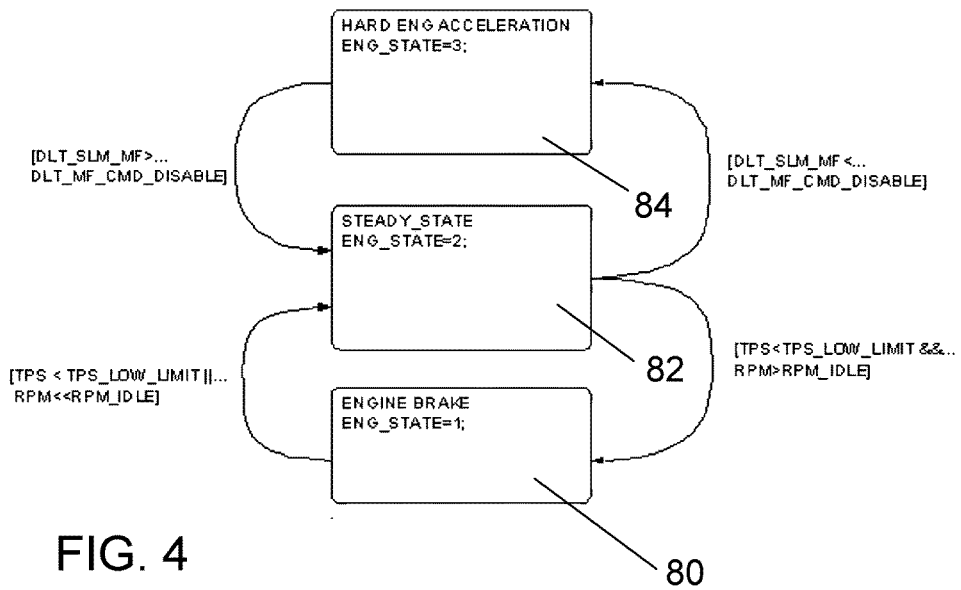
FIG. 4 is a state diagram.
Figure 5:
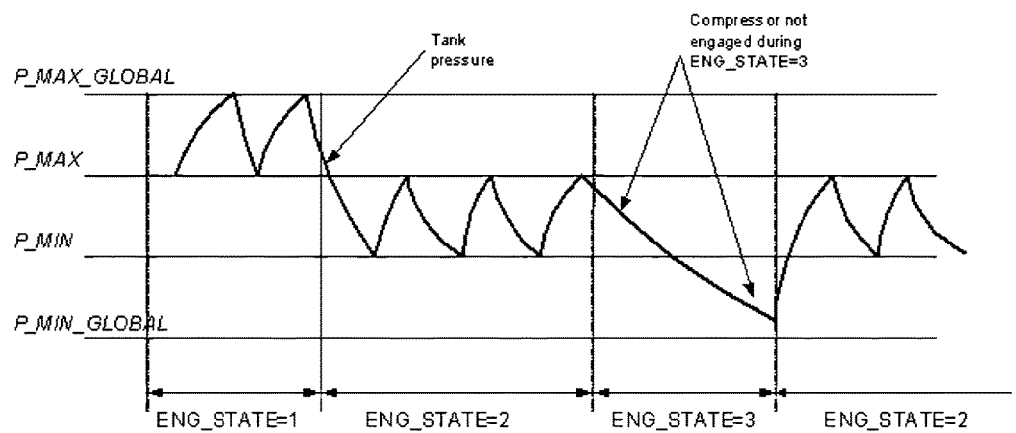
FIG. 5 is a chart relating air pressure in a truck pneumatic system over time.

The effect of engine operating variables on air compressor 60 loading may be seen in reference to the state diagram of FIG. 4 and the chart of FIG. 5. Air compressor 60 loading and unloading (ON and OFF conditions) depend on engine state (ENG_STATE=1, ENG_STATE=2, ENG_STATE=3) and tank pressure. ENG_STATE=1 (80) corresponds to engine braking and occurs when engine speed (RPM) is above idle speed and throttle/accelerator position (TPS) is close to or at zero. Under these circumstances air compressor 60 may be kept loaded when air pressure exceeds P_MAX up to P_MAX_GLOBAL. This allows the air compressor to recapture energy during engine braking of the vehicle. Usually the air compressor 60 is unloaded above P_Max because operation at increasingly high pressures becomes an increasing load on engine 30, but air pressure is allowed range up to P_MAX_GLOBAL as long as the engine 30 is not using fuel. Air compressor 60 may also shift from an unloaded to a loaded state during engine braking when air pressure is between P_MIN and P_MAX. State changes from ENG_STATE=3 (84) directly to ENG_STATE=1 (80) are not allowed in this embodiment.

ENG_STATE=3 (84) corresponds to high power demands on the engine, such as occur under hard acceleration. ENG_STATE=3 (84) occurs when the current value of operating variable DLT_SLM_MF falls below a minimum limit. DLT_SLM_MF is the difference between MF_SLM and MF_TOT. When DLT_SML_MF falls below its minimum limit, DLT_MF_CMD_DISABLE, air pressure in the air storage facility 54 is allowed to drop all the way to the lower global limit, P_MIN_GLOBAL, without loading the air compressor 60. However, if air pressure drops below P_MIN_GLOBAL air compressor 60 is loaded notwithstanding current engine operating conditions. In this way the compressor load on engine 30 is minimized during hard acceleration events or hill climbing. This can reduce the possibility of using boosted air during acceleration, improve engine acceleration and reduce smoke emissions. ENG_STATE=2 (82) is a steady state indicated for all engine 30 conditions not included in the other states. The compressor is unloaded and loaded as air pressure varies between P_MAX and P_MIN, respectively.

What is claimed is:

1. A vehicle pneumatic system, comprising:
   an engine having a predetermined idle speed, and having a maximum allowed fuel flow (MF_TOT) and a maximum fuel allowed for smoke limiting (MF_SLM);
   an air compressor coupled to the engine to be driven by the engine;
   an air storage facility connected to receive air pumped by the air compressor;
   an air compressor unloader;
   an air pressure sensor for reading air pressure in the air storage facility and sending signals representative thereof;
   the air storage facility having a predetermined normal operating maximum pressure and a predetermined normal operating minimum pressure;
   the air storage facility also having a predetermined global minimum pressure which is less than the predetermined normal operating minimum pressure, and having a predetermined global maximum pressure greater than the predetermined normal operating maximum pressure;
   engine condition sensors for indicating power output from or absorption by the engine, power requested from the engine and engine speed and sending corresponding respective engine condition signals indicative thereof;
   an engine control module operatively connected with the air pressure sensor and at least one of the engine condition sensors for receiving the air pressure signals and the engine condition signals, with the engine control module programmed to determine whether the engine is operating in one of: 1) a first engine state in which the engine speed is above the predetermined idle speed of the engine and the power requested from the engine is below a predetermined A minimum power; and 2) a third engine state in which the value of the difference between MF_SLM and MF_TOT is below a predetermined minimum; and 3) a second engine state which is a steady state indicated for all engine conditions not included in the first engine state and the third engine state;
   the engine control module operatively connected with the unloader to control operation of the unloader;
   when the engine is operating in the second engine state, the engine control module controls the unloader to cycle the unloader on and off to maintain the pressure in the air storage facility between the predetermined normal operating maximum pressure and the predetermined normal operating minimum pressure, with the pressure not allowed to exceed the predetermined normal operating maximum pressure or fall below the predetermined normal operating minimum pressure;
   when the engine is operating in the first engine state, the engine control module controls the unloader to allow the pressure in the air storage facility to exceed the predetermined normal operating maximum pressure up to the predetermined global maximum pressure; and
   when the engine is operating in the third engine state, the engine control module controls the unloader to allow the pressure in the air storage facility to fall below the predetermined normal minimum pressure down to the predetermined global minimum pressure.

2. The vehicle pneumatic system of claim 1, further comprising:
   the air compressor unloader being pneumatically powered; and
   a three-way valve under the control of the engine control module for fluidically connecting the air compressor unloader to the compressed air facility or to an ambient environment.

* * * * *